US010578156B2

(12) United States Patent
Jiang et al.

(10) Patent No.: US 10,578,156 B2
(45) Date of Patent: Mar. 3, 2020

(54) MAGNETIC BEARING FAULT-TOLERANT DRIVE SYSTEM

(71) Applicant: Carrier Corporation, Jupiter, FL (US)

(72) Inventors: Dong Jiang, East Hartford, CT (US); Parag Kshirsagar, East Hartford, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 306 days.

(21) Appl. No.: 15/518,432

(22) PCT Filed: Oct. 27, 2015

(86) PCT No.: PCT/US2015/057453
§ 371 (c)(1),
(2) Date: Apr. 11, 2017

(87) PCT Pub. No.: WO2016/069522
PCT Pub. Date: May 6, 2016

(65) Prior Publication Data
US 2017/0307012 A1    Oct. 26, 2017

Related U.S. Application Data

(60) Provisional application No. 62/069,524, filed on Oct. 28, 2014.

(51) Int. Cl.
*F16C 32/04* (2006.01)
(52) U.S. Cl.
CPC ...... *F16C 32/0442* (2013.01); *F16C 32/0451* (2013.01); *F16C 32/0457* (2013.01); *F16C 32/0474* (2013.01)

(58) Field of Classification Search
CPC .................. H02K 11/00; H02K 7/09
See application file for complete search history.

(56) References Cited

U.S. PATENT DOCUMENTS 3,330,970 A * 7/1967 Wennerberg ........... G05B 11/18
327/50
4,234,838 A * 11/1980 Langley ................. G05B 19/40
318/135

(Continued)

FOREIGN PATENT DOCUMENTS

CN      1701503 A    11/2005
CN    103425052 A    12/2013

(Continued)

OTHER PUBLICATIONS

International Search Report for PCT/US2015/057453, dated Feb. 2, 2016, pp. 1-7.

(Continued)

*Primary Examiner* — William H. Mayo, III
*Assistant Examiner* — Krystal Robinson
(74) *Attorney, Agent, or Firm* — Cantor Colburn LLP

(57) ABSTRACT

An electronic magnetic bearing fault-tolerant drive module includes a first plurality of switching elements and a second plurality of switching elements. At least one winding is interposed between the first plurality of switching elements and the second plurality of switching elements. The first and second switching elements are configured to selectively operate in a first mode and a second mode to generate an electromagnetic field. The electronic magnetic bearing fault-tolerant drive module is configured to detect one or more electrical faults including an open-circuit fault of at least one of the first and second switching elements.

11 Claims, 6 Drawing Sheets

(56) References Cited

U.S. PATENT DOCUMENTS

| | | | | |
|---|---|---|---|---|
| 4,997,237 | A | * | 3/1991 | Ricker ............... B60T 8/4266 |
| | | | | 303/115.2 |
| 5,216,339 | A | * | 6/1993 | Skybyk ................. H02K 3/46 |
| | | | | 310/112 |
| 5,287,046 | A | * | 2/1994 | Carpenter ............ G11B 21/02 |
| | | | | 318/293 |
| 5,304,882 | A | * | 4/1994 | Lipo ..................... H02K 21/16 |
| | | | | 310/106 |
| 5,347,191 | A | | 9/1994 | Wood |
| 5,574,345 | A | | 11/1996 | Yoneta et al. |
| 5,625,268 | A | * | 4/1997 | Miyanari ................ H02P 8/20 |
| | | | | 318/280 |
| 5,663,605 | A | * | 9/1997 | Evans .................. H02K 1/223 |
| | | | | 174/DIG. 21 |
| 5,889,347 | A | * | 3/1999 | Tang .................. H02K 19/103 |
| | | | | 310/165 |
| 5,973,431 | A | * | 10/1999 | Li ........................ H02P 25/092 |
| | | | | 310/156.15 |
| 6,005,316 | A | * | 12/1999 | Harris ............... F16C 32/0457 |
| | | | | 310/90.5 |
| 6,100,618 | A | * | 8/2000 | Schoeb ................. F04D 1/006 |
| | | | | 310/90 |
| 6,111,333 | A | * | 8/2000 | Takahashi ......... F16C 32/0489 |
| | | | | 310/68 B |
| 6,118,241 | A | | 9/2000 | Kazlauskas |
| 6,130,494 | A | * | 10/2000 | Schob ............... F16C 32/0463 |
| | | | | 310/90.5 |
| 6,249,067 | B1 | * | 6/2001 | Schob ............... F16C 32/0446 |
| | | | | 310/68 B |
| 6,297,574 | B1 | | 10/2001 | Schob et al. |
| 6,900,657 | B2 | * | 5/2005 | Bui ........................... H02P 8/36 |
| | | | | 324/545 |
| 7,116,066 | B2 | | 10/2006 | Lin |
| 2006/0125436 | A1 | | 6/2006 | Lin |
| 2016/0141995 | A1 | * | 5/2016 | Chen .................... H02P 25/092 |
| | | | | 318/254.1 |
| 2019/0027965 | A1 | * | 1/2019 | Huang .................. B60L 53/12 |

FOREIGN PATENT DOCUMENTS

| | | |
|---|---|---|
| CN | 103490690 A | 1/2014 |
| WO | 2015067309 A1 | 5/2015 |

OTHER PUBLICATIONS

Office Action for Chinese Application No. 201580059213.4, Application filing date Oct. 27, 2015; dated Jul. 25, 2018. 21 pages.

\* cited by examiner

MAGNETIC BEARING FAULT-TOLERANT DRIVE SYSTEM

CROSS REFERENCE TO RELATED APPLICATIONS

This application is a National Stage application of International Patent Application Serial No. PCT/US2015/057453, filed Oct. 27, 2015, which claims benefit to U.S. Provisional Application No. 62/069,524, filed Oct. 28, 2014, which are incorporated herein by reference in their entirety.

TECHNICAL FIELD

The present invention relates generally to electronic fault protection systems, and more particularly, to a magnetic bearing drive system including electronic fault protection architecture.

BACKGROUND

Rotational machines implement contact-less active magnetic bearings in widespread applications ranging from oil-free compressors, pumps, flywheels for energy storage, and rotational shafts. The bearing itself is levitated in a contact-less manner in response to realizing an electromagnetic filed generated by an electronic magnetic bearing driver circuit that includes a plurality of power electronic devices. Failure of one or more of the power electronic devices such as an open-circuit fault, for example, can result in the loss of the magnetic bearing levitation. A loss in bearing levitation at the time when a rotating shaft (e.g., a rotor) is rotating at a high speed can cause severe damage to the mechanical components.

SUMMARY

According to an embodiment, an electronic magnetic bearing fault-tolerant drive module includes a first plurality of switching elements and a second plurality of switching elements. At least one winding is interposed between the first plurality of switching elements and the second plurality of switching elements. The first and second switching elements are configured to selectively operate in a first mode and a second mode to generate an electromagnetic field. The electronic magnetic bearing fault-tolerant drive module is configured to detect one or more electrical faults including an open-circuit fault of at least one of the first and second switching elements.

In addition to one or more of the features described above, or as an alternative, further embodiments include:

a feature, wherein a diode connected across each switching element among the first and second plurality of switching elements to form a plurality of bi-directional phase-leg circuits;

a feature, wherein the first mode is configured to generate at least one winding current in a first direction through the at least one winding in response to receiving a first PWM output signal, and to generate the at least one winding current in a second direction opposite the first direction through the at least one winding in response to receiving a second PWM output signal;

a feature, wherein a first winding is interposed between a first bi-directional phase-leg circuit and a second bi-directional phase leg circuit forming a first H-bridge circuit, and a second winding is interposed between a second bi-directional phase-leg circuit and a third bi-directional phase leg circuit forming a second H-bridge circuit;

a feature, wherein the first H-bridge circuit and the second H-bridge circuit share a single common phase-leg, and wherein the first H-bridge circuit is configured to control the first winding current through the first winding and the second H-bridge circuit is configured to control a second winding current through the second winding, the second winding current controlled to have an opposite direction with respect to the first winding current; and a feature, wherein each bi-directional phase-leg circuit includes a first switching element configured to conduct current based on the first mode and inhibit current based on the second mode, and a second switching element configured to inhibit current based on the first mode and conduct current based on the second mode.

According to another embodiment, an electronic magnetic bearing fault-tolerant drive system includes an electronic magnetic bearing fault-tolerant drive module configured to selectively operate in a first mode in response to receiving the first PWM output signal and a second mode in response to receiving the second PWM output signal. The electronic magnetic bearing fault-tolerant drive system further includes an electronic fault detection module in electrical communication with the electronic magnetic bearing fault-tolerant drive module. The electronic fault detection module is configured to output a fault command signal in response to detecting an electrical fault of the electronic magnetic bearing fault-tolerant drive system, where the fault command signal initiates transition from the first mode to the second mode.

In addition to one or more of the features described above, or as an alternative, further embodiments include:

a feature, wherein an electronic fault-tolerant current controller module configured to selectively output a first PWM output signal and a second PWM output signal;

a feature, wherein in response to receiving the fault command signal, the electronic fault-tolerant current controller module disconnects the first PWM output signal and outputs the second PWM output signal to switch the electronic magnetic bearing fault-tolerant drive module from the first mode to the second mode;

a feature, wherein the magnetic bearing fault-tolerant drive module includes at least one winding configured to generate an electromagnetic field in response to receiving a winding current flowing in a first direction;

a feature, wherein the fault detection module detects an open-circuit fault of the magnetic bearing fault-tolerant drive module based on a comparison between the at least one winding current and a threshold value;

a feature, wherein the electronic magnetic bearing fault-tolerant drive module includes a plurality of bi-directional phase-leg circuits connected to the at least one winding to form at least one H-bridge circuit;

a feature, wherein the bi-directional phase-leg circuits are configured to generate the winding current in a first direction in response to receiving the first PWM output signal having a first phase and to generate the winding current in a second direction opposite the first direction in response to receiving the second PWM output signal having a second phase opposite the first phase;

a feature, wherein the plurality of bi-directional phase-leg circuits each includes a first switching element configured to generate current based on the first mode and inhibit current based on the second mode, and a second switching element configured to inhibit current based on the first mode and generate current based on the second mode; and a feature, wherein the at least one electrical fault includes an open-circuit fault induced in response to a failure of the first switching element.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1A:
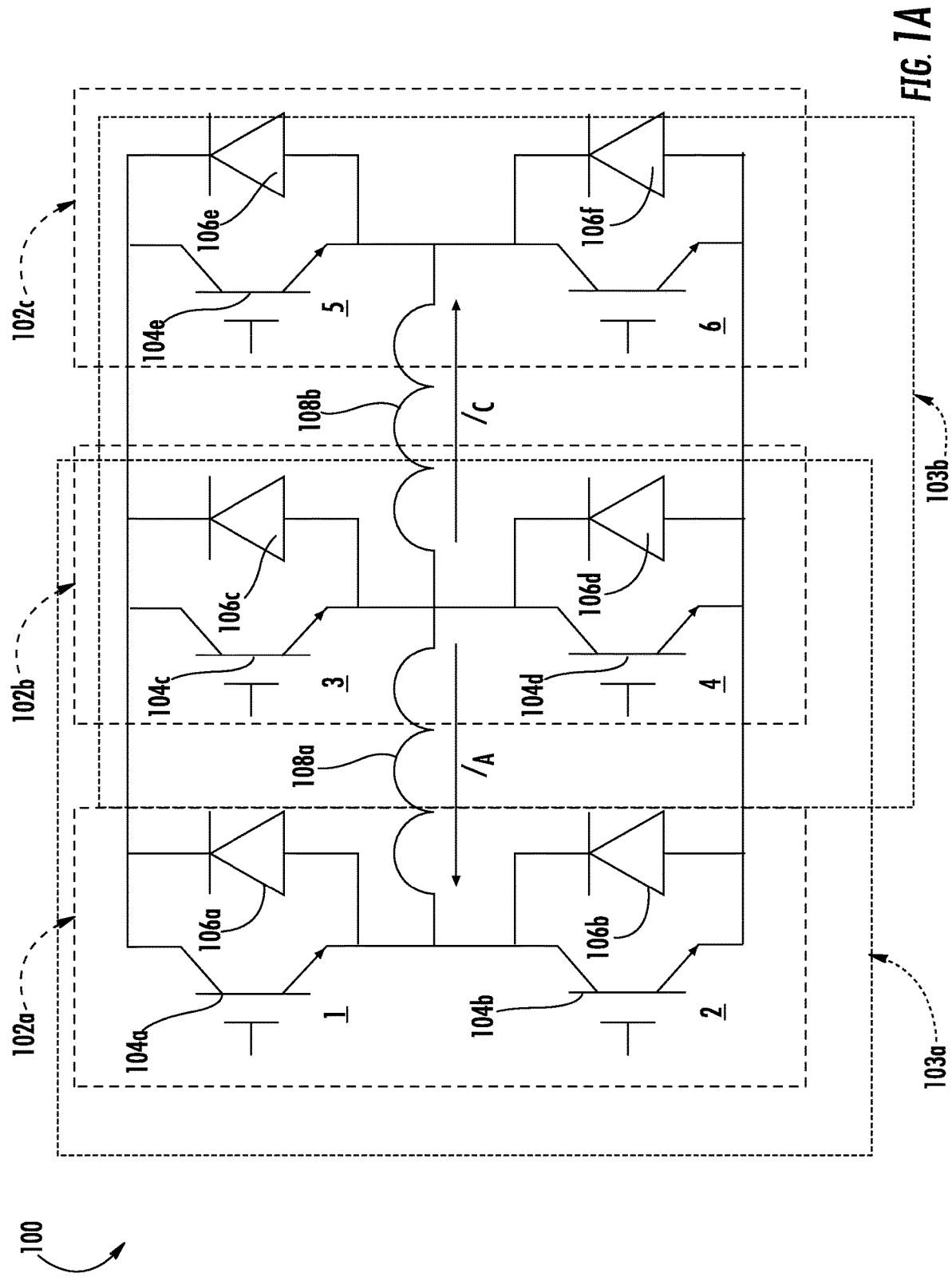
FIG. 1A is an electrical schematic diagram of a fault-tolerant magnetic bearing drive module according to an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A magnetic bearing fault-tolerant drive system includes an electronic fault-tolerant magnetic bearing drive module configured to selectively operate in a first mode, i.e., a normal mode, and a second mode, i.e., an auxiliary mode. The fault-tolerant magnet bearing drive module may include a three-phase converter and a plurality of switching elements such as transistors, for example, to drive the three-phase converter. When operating in the normal mode, a first plurality of switching elements is activated to generate a winding current in a first direction, which in turn drives the three-phase converter and generates an electromagnetic force that levitates the bearing of the rotary system.

When the auxiliary mode is selected (e.g., in response to detecting electrical fault), the first plurality of switching elements is deactivated and a second plurality of switching elements are activated to drive the three-phase converter. In this manner, the winding current is generated in a second direction different from the first direction, while still driving the three-phase converter. Since electromagnetic forces are determined by the absolute value of winding current (i.e., is independent from the direction of the winding current), a similar electromagnetic force can still be generated using the auxiliary mode and levitation of the bearing can be maintained.

Turning now to FIG. 1A, an electrical schematic diagram of an electronic fault-tolerant magnetic bearing drive module 100. According to a non-limiting embodiment, the electronic fault-tolerant magnetic bearing drive module 100 is constructed as full-bridge three-phase converter. The electronic fault-tolerant magnetic bearing drive module 100 includes a first bi-directional phase-leg circuit 102a, a second bi-directional phase-leg circuit 102b, and a third bi-directional phase-leg circuit 102c. The two windings' current ($I_A$, $I_C$) are drive by the three phase-leg circuits 102a-102c, which can be viewed as two H-bridges 103a-103b, which share a single common phase-leg. Each H-bridge circuit 103a-103b is configured to generate a respective winding current ($I_A$, $I_C$) capable of flowing in first and second opposing directions. Although three bi-directional phase-leg circuits 102a-102c are shown, it is appreciated that bi-directional circuits with more than three phase-legs can be used. For example, the electronic fault-tolerant magnetic bearing drive module 100 can be constructed with two bi-directional phase-leg circuits or four bi-directional phase-leg circuits without changing the scope of the invention.

The first bi-directional phase-leg circuit 102a includes a first switching element 104a and a second switching element 104b. The second bi-directional phase-leg circuit 102b includes a third switching element 104c and fourth switching element 104d. The third bi-directional phase-leg circuit 102c includes a fifth switching element 104e and sixth switching element 104f. According to a non-limiting embodiment, the switching elements are insulated-gate bipolar transistors (IGBT). It is appreciated, however, that other semiconductor switching elements can be used including, but not limited, metal oxide field effect transistors (MOSFET). The electronic fault-tolerant magnetic bearing drive module 100 also includes diodes 106 connected across the collector and emitter of each switching element 104a-104f. In this manner, the winding currents $I_A$,$I_C$ can each be generated in opposing first and second directions based on the phase (i.e., positive or negative) of the signal that drives the switching elements 104a-104f as discussed in greater detail below.

Each bi-directional phase-leg circuit 102a-102c is center-tapped with a respective winding. For example, a first winding 108a includes a first end and a second end. The first end is connected between to the emitter of the first switching element 104a and the collector second switching element 104b. The second end is connected to the emitter of the third switching element 104c and the collector of the fourth switching element 104d. Accordingly, a first H-bridge circuit 103a is formed using the first winding 108a. Similarity, a second winding 108b includes a first end and a second end. The first end is connected the emitter of the third switching element 104c and the collector of the fourth switching element 104d. The second end is connected to the emitter of the fifth switching element 104e and the collector of the sixth switching element 104f. Accordingly, a second H-bridge circuit 103b is formed using the second winding 108b. According to an embodiment, the two H-bridge circuits 103a-103b share a common phase-leg, e.g., phase-leg 102-b.

Figure 1B:
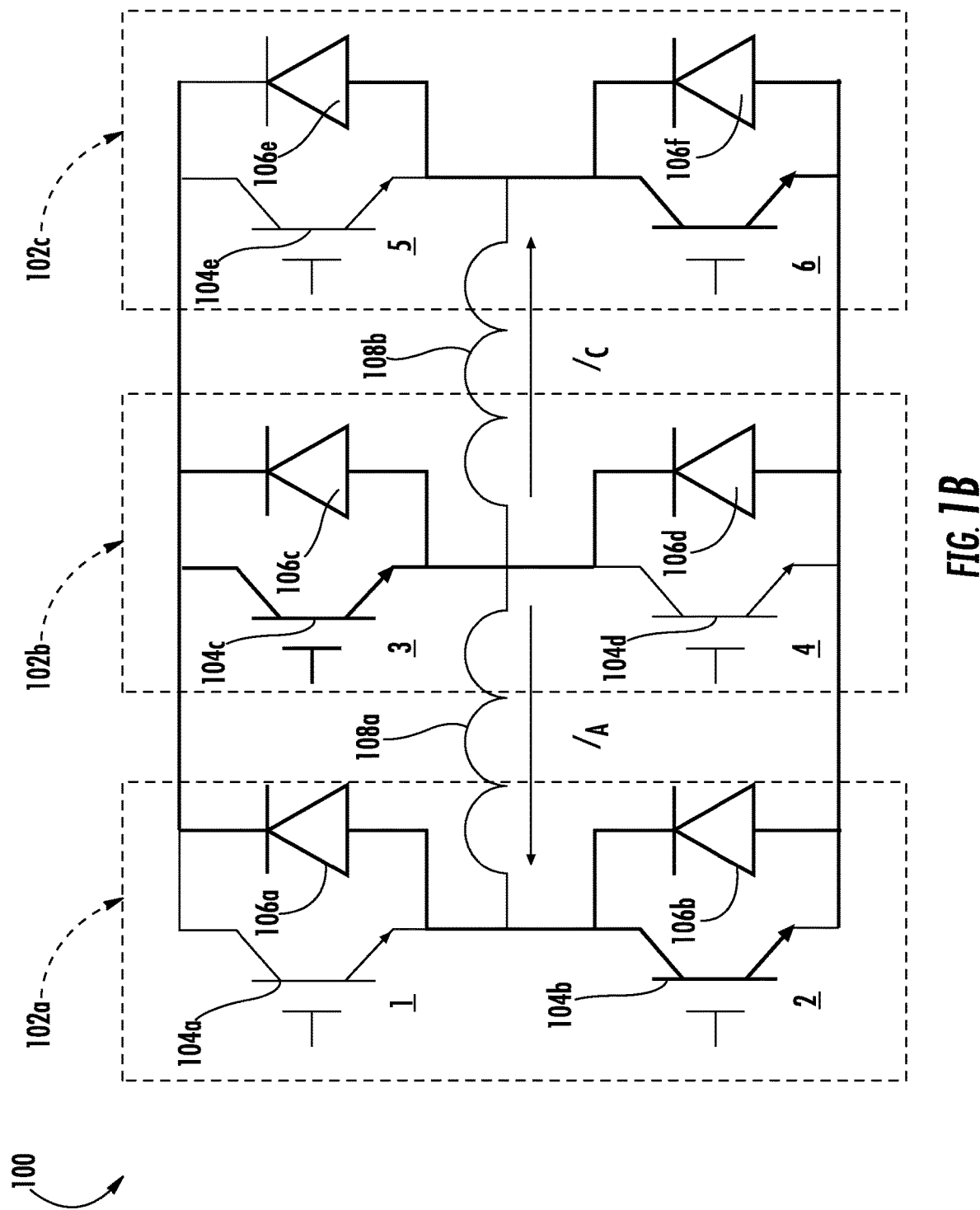
FIG. 1B is a an electrical schematic diagram of the fault-tolerant magnetic bearing drive module operating in a first mode according to an exemplary embodiment.

Turning now to FIG. 1B, the electronic fault-tolerant magnetic bearing drive module 100 is illustrated operating in a first mode, e.g., a normal mode. According to an embodiment, each bi-directional phase-leg circuit 102a-

102c includes at least one activated switching element and at least one deactivated switching element. The darkened lines indicate the switching elements that are activated during the normal mode. In this case, for example, the first switching element 104a, the fourth switching element 104d and the fifth switching element 104e are in deactivated, while the second switching element 104b, the third switching element 104c, and the sixth switching element 104f are activated. The deactivated switching elements 104a, 104d, 104e inhibit current flow, while the activated switching elements 104b, 104c and 104f conduct current flow. Accordingly, the activated second switching element 104b and third switching element 104c generate and control a first winding current $I_A$ flowing in a first direction through the first winding 108a. The activated third switching element 104c and sixth switching element 104f generate and control a second winding current $I_C$ flowing in a second direction through the second winding 108b. The second winding current $I_C$ flows in a direction opposite the first direction of the first winding current $I_A$. The first winding current $I_A$ induces a first electromagnetic field in response to flowing through the first winding 108a and the second winding current $I_C$ generates a second electromagnetic field in response to flowing through the second winding 108b. The first and second electromagnetic fields magnetically levitate one or more bearings in a contact-less manner.

Figure 1C:
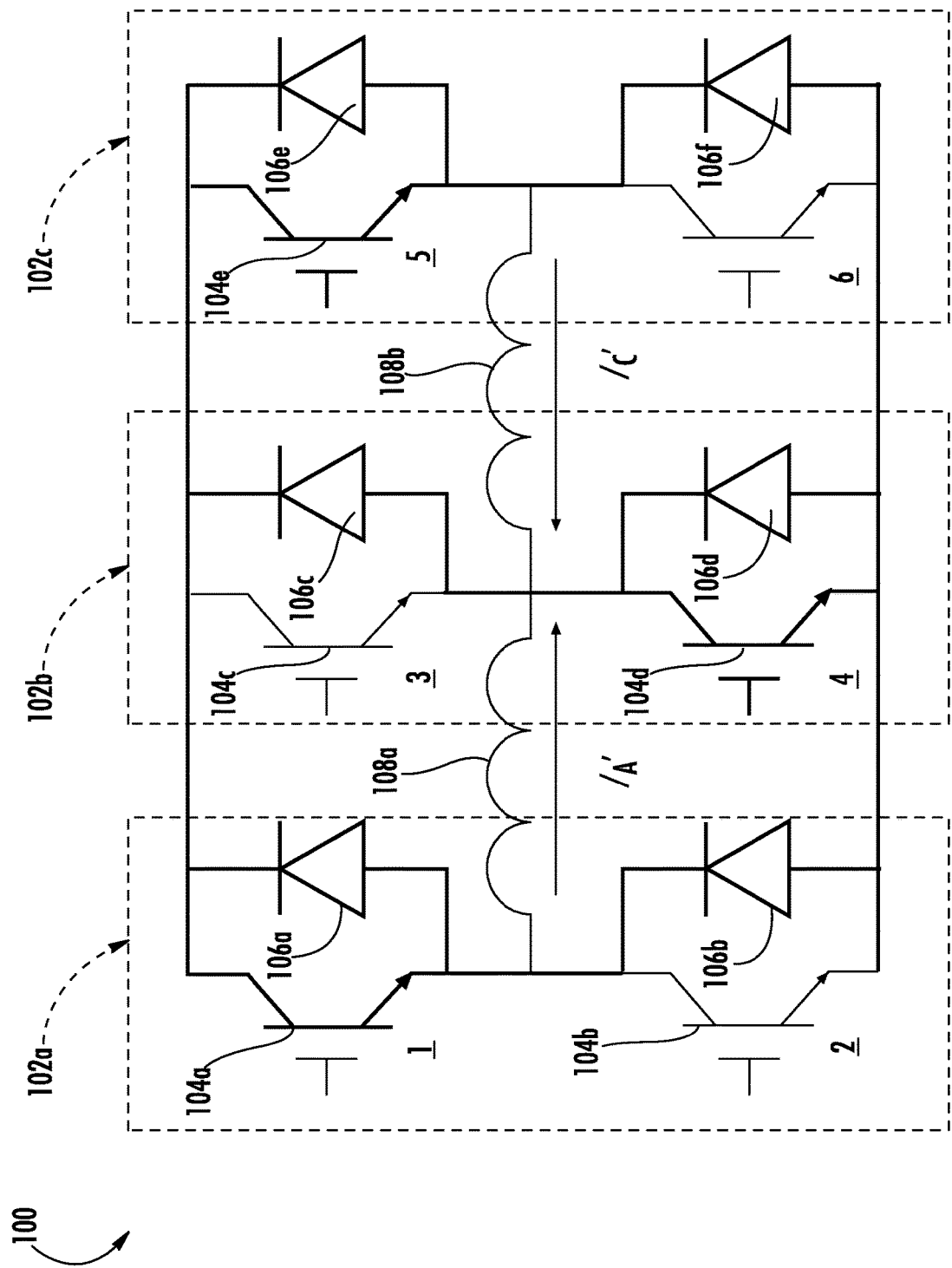
FIG. 1C is a an electrical schematic diagram of the fault-tolerant magnetic bearing drive module operating in a second mode according to an exemplary embodiment.

Turning now to FIG. 1C, the electronic fault-tolerant magnetic bearing drive module 100 is illustrated operating in a second mode, e.g., an auxiliary mode. According to at least one embodiment, the electronic fault-tolerant magnetic bearing drive module 100 is switched from the normal mode to the auxiliary mode in response to detecting one or more circuit faults including, but not limited to, an open-circuit fault. The open-circuit fault can occur, for example, when one or more switching elements 104b, 104c, 104f activated during the normal operating mode fails. According to an embodiment, each bi-directional phase-leg circuit 102a-102c includes at least one activated switching element and at least one deactivated switching element. The darkened lines indicate the switching elements that are activated during the auxiliary mode, while the non-darkened lines indicated the switching elements that are de-activated.

When operating in the auxiliary mode, for example, the second switching element 104b, the third switching element 104c, and the sixth switching element 104f are deactivated, and the first switching element 104a, the fourth switching element 104d and the fifth switching element 104e are activated. In this case, the activated switching elements 104a, 104d, 104e conduct current flow while the deactivated switching elements 104b, 104c and 104f inhibit current flow. Accordingly, the activated first switching element 104a and fourth switching element 104d generate and control a first winding current $I_A'$ flowing in a first direction through the first winding 108a. The activated third switching element 104d and fifth switching element 104e generate and control a second winding current $I_C'$ flowing in a second direction through the second winding 108b. The second winding current $I_C'$ flows in a direction opposite the first direction of the first winding current $I_A$. Moreover, the first winding current $I_A'$ generated during the auxiliary mode flows in an opposite direction (i.e., negative phase) with respect to the first winding current $I_A$ generated during the normal mode. Similarly, the second winding current $I_C'$ generated during the auxiliary mode flows in an opposite direction (i.e., negative phase) with respect to the second winding current $I_C$ generated during the normal mode.

The first winding current $I_A'$ induces a first electromagnetic field in response to flowing through the first winding 108a and the second winding current $I_C'$ generates a second electromagnetic field in response to flowing through the second winding 108b. The electromagnetic fields are determined by the absolute value of winding current $I_A'$, $I_C'$. Since the magnetic bearing force is independent from the direction of the winding currents $I_A$, $I_A'$, $I_C$, and $I_C'$, both the normal mode and the auxiliary mode can generate similar levitation forces. Accordingly, one or more bearings can be maintained in a contact-less levitation state without interruption when switching from the normal mode to the auxiliary mode.

Figure 2:
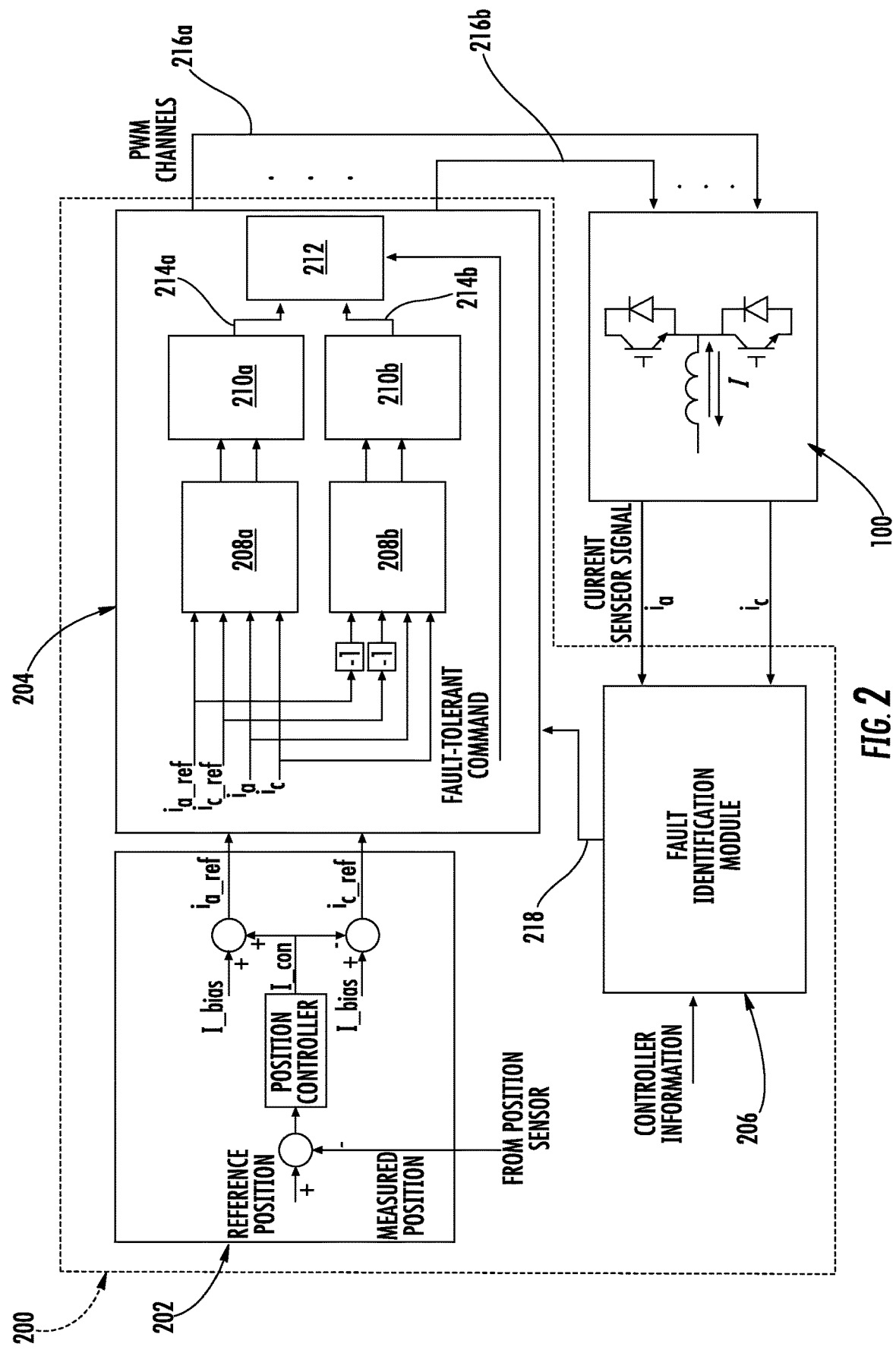
FIG. 2 is a block diagram of a magnetic bearing fault-tolerant drive control system according to an exemplary embodiment.
Figure 3:
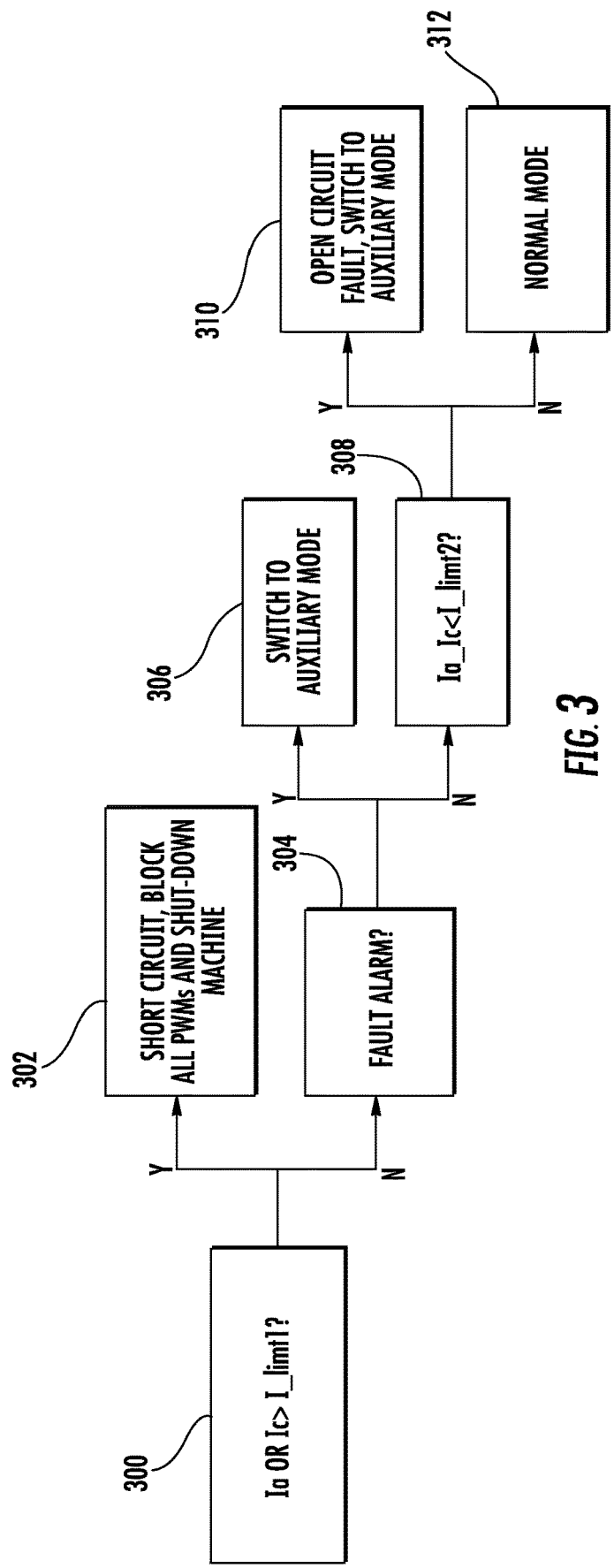
FIG. 3 is a flow diagram illustrating a fault identification procedure performed by the magnetic bearing fault-tolerant drive system according to an exemplary embodiment.

Turning now to FIG. 2, an electronic magnetic bearing fault-tolerant drive control system 200 is illustrated according to a non-limiting embodiment. The magnetic bearing fault-tolerant drive system 200 implements an electronic fault-tolerant magnetic bearing drive module 100 and is configured to detect various electrical faults including, for example, an open-circuit fault caused by one or more failed switching elements 102a-102f. In response to detecting the fault, the magnetic bearing fault-tolerant drive system 200 is configured to control operation of the fault-tolerant magnetic bearing drive module 100. For example, the magnetic bearing fault-tolerant drive system 200 is configured to switch the fault-tolerant magnetic bearing drive module 100 from the normal mode to the auxiliary mode in response to detecting an open-circuit fault.

The magnetic bearing fault-tolerant drive control system 200 includes an electronic magnetic bearing fault-tolerant drive module 100, and electronic position control module 202, an electronic fault-tolerant current controller module 204, and an electronic fault detection module 206. The fault-tolerant magnetic bearing drive module 100 operates according to the descriptions discussed in detail above. The position control module 202 determines a position error of a shaft coupled to a levitated bearing. In this manner, the position of the bearing, and thus the shaft, dictates the position error. Based on the magnetic force rated value, bias current I_bias is pre-determined, and in turn generates a first reference winding current (ia_ref) and a second reference winding current (ic_ref).

The fault-tolerant current controller module 204 is in signal communication with the position control module 202 to receive the first reference winding current signal (ia_ref) and the second reference winding current signal (ic_ref). The fault-tolerant current controller module 204 also receives winding current signals from one or more current sensors configured to detect the winding currents flowing through the windings included in the fault-tolerant drive module 100. As illustrated in FIG. 2, for example, the fault-tolerant current controller module 204 receives a first winding current signal (ia) indicative of the first winding current (Ia) and a second winding current signal (ic) indicative of the second winding current (Ic).

The fault-tolerant current controller module 204 further includes a first current regulator unit 208a, a second current regulator unit 208b, a first pulse width modulation (PWM) channel driver 210a, a second PWM channel driver 210b, and a PWM channel mixer 212. The first current PWM channel driver 210a generates a first PWM output signal 214a that drives switching elements 104b, 104c, and 104f activated during the normal mode. The second PWM channel driver 210b generates a second PWM output signal 214b that drives switching elements 104a, 104d, and 104e activated during the auxiliary mode. The first current regulator unit 208a receives first and second reference current signals (ia_ref), (ic_ref) in positive phase, while the second current regulator unit 208b receives first and second reference current signals (−ia_ref), (−ic_ref) in negative phase (i.e., inverse signals). Based on a comparison between the reference current signals (ia_ref, −ia_ref, ic_ref, −ic_ref) and the first and second winding current signals ($I_A$, $I_C$), the first and second PWM channel drivers 210a, 210b generate respective first and second PWM output signals 214a, 214b. A first PWM channel 216a is in signal communication with gate terminals of the normal mode switching elements 104b, 104c, and 104f and a second PWM channel 216b is in signal communication with gate terminals of the auxiliary mode switching elements 104a, 104d, and 104e. In this manner the first PWM output signal 214a drives the normal mode switching elements 104b, 104c, and 104f and the second PWM output signal 214b drives the auxiliary mode switching elements 104a, 104d, and 104e.

The PWM channel mixer 212 processes the first and second PWM output signals 214s, 214b along with a fault command signal 218 generated by the fault detection module 206. The fault detection signal 218 commands the PWM channel mixer 212 to selectively output either the first PWM output signal 214a or the second PWM output signal 216b. In this manner, the normal mode or the auxiliary mode of the fault-tolerant magnetic bearing drive module 100 can be initiated, as discussed in greater detail below.

To initiate the normal mode of the fault-tolerant magnetic bearing drive module 100, the positive phase reference current signals (ia_ref, ic_ref), are sent to the respective current regulators 208a, 208b. The corresponding duty cycles are also generated and sent to the respective PWM channel drivers 210a, 210b. The first PWM output signal 214a for driving the normal mode switching elements 104b, 104c, 104f are generated and the second PWM output signal 214b for driving the auxiliary mode switching elements 104a, 104d, 104e are inhibited (i.e., blocked) from reaching the second PWM channel 216b. Accordingly, the normal mode of the fault-tolerant magnetic bearing drive module 100 is initiated. When the fault command signal 218 is generated, negative phase reference currents (−ia_ref, −ic_ref) are output to the second current regulator 208b. The corresponding duty cycles are also generated and sent to the second PWM channel driver 210b. The second PWM output signal 214b for driving the auxiliary mode switching elements 104a, 104d, 104e are output to the second PWM channel 216, while the first PWM output signal 214a for driving the normal mode switching elements 104b, 104c, 104f are inhibited from reaching the first PWM channel 216a. Accordingly, the auxiliary mode of the fault-tolerant magnetic bearing drive module 100 is initiated.

The fault detection module 206 is configured to detect one or more electrical faults of the fault-tolerant magnetic bearing drive module 100 when operating in the normal mode. According to an embodiment, the fault detection module 206 executes a systematical fault identification procedure comprising a plurality of identification operations that determine different in each control cycle. The identification procedure will now be described with reference to FIG. 4. A first identification operation is configured to detect an over-current protection scenario. For instance, if either of the winding currents $I_A$, $I_C$ exceeds the over-current limit (I_limit1) at operation 300, a short-circuit fault, for example, is detected and all the PWM outputs signals (i.e., 214a and 214b) are blocked at operation 302 such that the whole motor drive system and the magnetic bearing drive 100 are deactivated.

If the winding currents $I_A$, $I_C$ do not exceed the over-current limit (I_limit1) at operation 300, a second identification operation to detect an external fault is performed at operation 304. The detection of an external fault is based on a fault signal generated by the fault-tolerant magnetic bearing drive module 100. If the fault-tolerant magnetic bearing drive module 100 detects a fault at operation 304, such as a desaturation fault detected by a power electronic device, the fault-tolerant control is activated and the fault tolerant command signal commands the PWM channel mixer 212 to disconnect the first PWM output signal 214a and output the second PWM output signal 214b. For example, a desaturation (DESAT) fault protection driver configured with overcurrent DESAT protection can output can be leveraged with the controller such that the controller can therefore detect the fault without sensing current and turn-off the switch before failure. In this manner, the normal mode switching elements 104b, 104c, 104f are deactivated and the auxiliary mode switching elements 104a, 104d, 104e are activated such that the fault-tolerant magnetic bearing drive module 100 is switched from the normal mode to the auxiliary mode at operation 306.

If a fault is not detected at operation 304, a third identification operation is configured to detect an electrical fault based on a winding current total (i.e., $I_A + I_C$) and a threshold value (I_limit2) at operation 308. When operating in the normal mode, a total (i.e., summation) of the first and second winding currents ($I_A + I_C$) will be approximately twice the bias current (i.e., 2×I_bias). As mentioned above, the bias current (I_bias) has been pre-determined. Thus, the threshold value (I_limit2) can be based on a position of the bearing. That is, I_limit2 can be set, for example, equal to approximately 1.5×I_bias. If $I_A + I_C$ is less than the I_limit2 at operation 308, an open-circuit fault is detected and the fault-tolerant magnetic bearing drive module 100 is switched to the auxiliary mode at operation 310. If all the three identification steps determine that no fault exists, the fault-tolerant magnetic bearing drive module 100 continues to operate in normal mode at operation 312.

Figure 4:
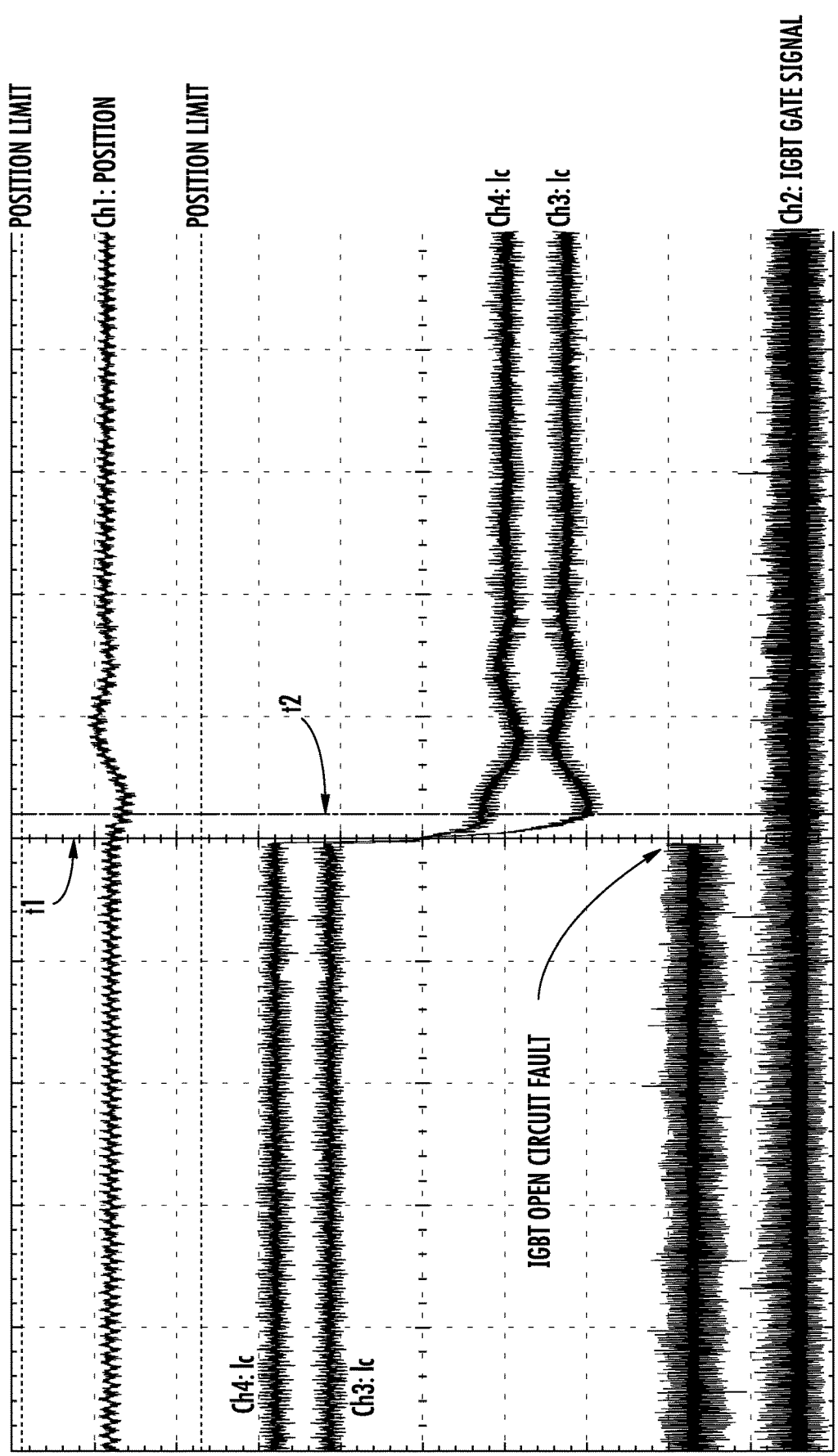
FIG. 4 is a signal diagram illustrating operation of a magnetic bearing fault-tolerant drive system according to an exemplary embodiment.

Referring to FIG. 4, a signal diagram illustrates operation of a magnetic bearing fault-tolerant drive system according to a non-limiting embodiment. In this example, the fault-tolerant magnetic bearing drive module 100 is initially operating in the normal mode. The Channel 1 signal (Ch1) indicates that a position of rotary shaft coupled to a levitating bearing exists in a centered position. The Channel 2 signal (Ch2) indicates operation of a central switching element gate signal. The Channel 3 signal (Ch3) and the Channel 4 signal (Ch4) indicate the first and second winding currents ($I_A$, $I_C$), respectively, which are initially in positive phase. At time (t1), Ch2 is cut off due to, for example, an open-circuit fault, and the first and second winding currents ($I_A$, $I_C$) begin to drop as indicated by Ch3 and Ch4.

At approximately t2, the fault detection module 206 detects the fault and generates the fault-tolerant command signal. The fault tolerant command signal commands the PWM channel mixer 212 to inhibit the first PWM output signal 214a and output the second PWM output signal 214b, thereby initiating the auxiliary mode of the fault-tolerant magnetic bearing drive module 100. Accordingly, the first and second winding currents $I_A'$, $I_C'$ are generated in negative phase within approximately 1 millisecond (ms) from time t1. It is appreciated that the detection time could also be less than 1 ms. In this manner, levitation of the bearing can be maintained such that the positional axis of the rotary shaft is kept centered between two position limits with small transient as indicated by Ch1. Therefore, the magnetic bearing fault-tolerant drive system 200 can effectively detect one or more faults such as an open-circuit fault, for example, and successfully maintain levitation of the bearing and axial position of a corresponding rotational shaft. In addition, the magnetic bearing fault-tolerant drive system 200 allows for re-starting the system with the back up working mode. It is much easier than replacing the hardware and the maintenance cost is reduced.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electronic magnetic bearing fault-tolerant drive module, comprising:
    a first plurality of switching elements and a second plurality of switching elements; and
    at least one winding interposed between the first plurality of switching elements and the second plurality of switching elements, the first and second plurality of switching elements configured to selectively operate in a first mode and a second mode to generate an electromagnetic field,
    wherein the at least one winding includes a first winding is interposed between a first bi-directional phase-leg circuit and a second bi-directional phase leg circuit forming a first H-bridge circuit, and a second winding is interposed between the second bi-directional phase-leg circuit and a third bi-directional phase leg circuit forming a second H-bridge circuit, and
    wherein the first H-bridge circuit and the second H-bridge circuit share a single common phase-leg, and wherein the first H-bridge circuit is configured to control the first winding current through the first winding and the second H-bridge circuit is configured to control a second winding current through the second winding, the second winding current controlled to have an opposite direction with respect to the first winding current.

2. The electronic magnetic bearing fault-tolerant drive module of claim 1, further comprising a diode connected across each switching element among the first and second plurality of switching elements to form a plurality of bi-directional phase-leg circuits.

3. The electronic magnetic bearing fault-tolerant drive module of claim 2, wherein the first mode is configured to generate at least one winding current in a first direction through the at least one winding in response to receiving a first PWM output signal, and to generate the at least one winding current in a second direction opposite the first direction through the at least one winding in response to receiving a second PWM output signal.

4. The electronic magnetic bearing fault-tolerant drive module of claim 3, wherein each bi-directional phase-leg circuit includes a first switching element configured to conduct current based on the first mode and inhibit current based on the second mode, and a second switching element configured to inhibit current based on the first mode and conduct current based on the second mode.

5. An electronic magnetic bearing fault-tolerant drive system comprising:
    an electronic magnetic bearing fault-tolerant drive module configured to selectively operate in a first mode in response to receiving the first PWM output signal and a second mode in response to receiving the second PWM output signal;
    an electronic fault detection module configured to output a fault command signal in response to detecting an electrical fault of the electronic magnetic bearing fault-tolerant drive system, the fault command signal initiating transition from the first mode to the second mode,
    a first winding interposed between a first bi-directional phase-leg circuit and a second bi-directional phase leg circuit forming a first H-bridge circuit, and a second winding interposed between the second bi-directional phase-leg circuit and a third bi-directional phase leg circuit forming a second H-bridge circuit, and
    wherein the first H-bridge circuit and the second H-bridge circuit share a single common phase-leg, and wherein the first H-bridge circuit is configured to control the first winding current through the first winding and the second H-bridge circuit is configured to control a second winding current through the second winding, the second winding current controlled to have an opposite direction with respect to the first winding current.

6. The electronic magnetic bearing fault-tolerant drive system of claim 5, further comprising an electronic fault-tolerant current controller module configured to selectively output a first PWM output signal and a second PWM output signal.

7. The electronic magnetic bearing fault-tolerant drive system of claim 6, wherein in response to receiving the fault command signal, the electronic fault-tolerant current controller module disconnects the first PWM output signal and outputs the second PWM output signal to switch the electronic magnetic bearing fault-tolerant drive module from the first mode to the second mode.

8. The electronic magnetic bearing fault-tolerant drive system of claim 7, wherein the first and second windings are configured to generate an electromagnetic field in response to receiving at least one winding current flowing in a first direction.

9. The electronic magnetic bearing fault-tolerant drive system of claim 8, wherein the fault detection module detects an open-circuit fault of the magnetic bearing fault-tolerant drive module based on a comparison between the at least one winding current and a threshold value.

10. The electronic magnetic bearing fault-tolerant drive system of 9, wherein the first and second bi-directional phase-leg circuits each includes a first switching element configured to generate current based on the first mode and inhibit current based on the second mode, and a second switching element configured to inhibit current based on the first mode and generate current based on the second mode.

11. The electronic magnetic bearing fault-tolerant drive system of 10, wherein the at least one electrical fault includes an open-circuit fault induced in response to a failure of the first switching element.

* * * * *